US008281144B2

(12) United States Patent
Huh et al.

(10) Patent No.: US 8,281,144 B2
(45) Date of Patent: Oct. 2, 2012

(54) OWNERSHIP SHARING METHOD AND APPARATUS USING SECRET KEY IN HOME NETWORK REMOTE CONTROLLER

(75) Inventors: Mi-suk Huh, Yongin-si (KR); Bae-eun Jung, Yongin-si (KR); Bum-jin Im, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1063 days.

(21) Appl. No.: 11/649,267

(22) Filed: Jan. 4, 2007

(65) Prior Publication Data

US 2007/0162762 A1      Jul. 12, 2007

(30) Foreign Application Priority Data

Jan. 9, 2006 (KR) .................. 10-2006-0002450

(51) Int. Cl.
  *H04L 9/00* (2006.01)

(52) U.S. Cl. ............ 713/182; 713/168; 713/186; 726/2; 726/3; 726/5; 726/6; 726/7; 709/203; 709/208; 709/245

(58) Field of Classification Search .................. 713/168, 713/182, 186, 201; 709/203, 208, 245; 726/2–7
See application file for complete search history.

(56) References Cited

U.S. PATENT DOCUMENTS

| | | | | |
|---|---|---|---|---|
| 6,791,467 | B1 * | 9/2004 | Ben-Ze'ev | 340/825.69 |
| 7,158,777 | B2 * | 1/2007 | Lee et al. | 455/411 |
| 7,500,104 | B2 * | 3/2009 | Goland | 713/175 |
| 7,631,197 | B2 * | 12/2009 | Niwamoto et al. | 713/193 |
| 2003/0056114 | A1 * | 3/2003 | Goland | 713/201 |
| 2003/0115292 | A1 * | 6/2003 | Griffin et al. | 709/219 |

(Continued)

OTHER PUBLICATIONS

Rahman,M, Bhattacharya, P.. "Remote access and networked appliance control using biometrics features",Consumer Electronics, IEEE, May 2003, vol. 49, Issue: 2, pp. 348-353.*

(Continued)

*Primary Examiner* — Taghi Arani
*Assistant Examiner* — Amir Mehrmanesh
(74) *Attorney, Agent, or Firm* — NSIP Law

(57) ABSTRACT

An ownership sharing method and apparatus using a secret key in a home network remote controller are provided. A user who owns a home device generates an ownership authentication key using the secret key shared with the home device through the user's terminal device, and transmits the ownership authentication key to a terminal device of a particular user who wishes to share the ownership. The particular user can use the home device using the shared ownership authentication key, allowing for ownership of a device in home network environments based on a secret key that can be easily shared, obviating complicated calculation procedures that are no needed to share the ownership between an owner of a device and his family or customers, and achieving high security that is guaranteed based on the secret key.

8 Claims, 3 Drawing Sheets

U.S. PATENT DOCUMENTS

| | | | | |
|---|---|---|---|---|
| 2003/0221100 | A1* | 11/2003 | Russ et al. | 713/153 |
| 2004/0034772 | A1* | 2/2004 | Alao | 713/168 |
| 2004/0054899 | A1* | 3/2004 | Balfanz et al. | 713/168 |
| 2004/0259529 | A1* | 12/2004 | Suzuki | 455/411 |
| 2005/0010774 | A1* | 1/2005 | Rose et al. | 713/171 |
| 2005/0088275 | A1* | 4/2005 | Valoteau et al. | 340/3.1 |
| 2006/0153208 | A1* | 7/2006 | Costanzo | 370/401 |
| 2006/0155802 | A1* | 7/2006 | He et al. | 709/203 |
| 2006/0251256 | A1* | 11/2006 | Asokan et al. | 380/270 |
| 2006/0256008 | A1* | 11/2006 | Rosenberg | 342/367 |

OTHER PUBLICATIONS

Korean Notice of Preliminary Rejection issued Apr. 27, 2012 in counterpart Korean Patent Application No. 10-2006-0002450 (8 pages, in Korean with English language translation).

Junghwan Lee et al., "A New Device Authentication Protocols for Secure Services in Home Network Environments," The Journal of Korean Institute of Information Technology, pp. 57-65, Dec. 2005, No. 6, vol. 3 (9 pages, in Korean with English language Abstract).

* cited by examiner

OWNERSHIP SHARING METHOD AND APPARATUS USING SECRET KEY IN HOME NETWORK REMOTE CONTROLLER

CROSS-REFERENCE TO RELATED APPLICATIONS

This application claims the benefit under 35 U.S.C. §119(a) of Korean Patent Application No. 2006-2450, filed Jan. 9, 2006 in the Korean Intellectual Property Office, the entire disclosure of which is hereby incorporated by reference.

BACKGROUND OF THE INVENTION

1. Field of the Invention

The present invention relates to an ownership sharing method and apparatus using a secret key in a home network remote controller. More particularly, the present invention relates to an ownership sharing method and apparatus that uses a secret key in a home network remote controller, in which a user having an ownership of a home device generates an ownership authentication key using the secret key shared with the home device through his terminal device, transmits the ownership authentication key to a terminal device of a particular user who wishes to share the ownership, and the particular user can use the home device using the shared ownership authentication key.

2. Description of the Related Art

Generally, a home network system is a network system capable of performing for intelligent communications by performing network matching between a home network and outside networks.

In the home network, various home devices may be wirelessly interconnected and consist of information devices, audio/video (A/V) devices, control system devices and dummy devices. The information devices may be personal computers, faxes, scanners and printers. The A/V devices may be televisions, set-top boxes, digital video disks (DVDs), video cassette recorders (VCRs), audio, camcorder and domestic games. Additionally, the control system devices may be coffee makers, electric rice cookers, refrigerators, microwave ovens and cameras. The dummy devices may be remote controllers, interphones, sensors and lights.

The home devices generally form one network and home network users share all the home devices. According to the nature of each home device, devices can be used only by an owner or manager of the home device, or each home device can be limited to specific users.

To satisfy a such user's requirement, a method of setting available devices and unavailable devices for each user by a home network's manager has been suggested. However, if it is difficult to apply this method when the user accessing the home network has a family or a roommate. Since each user may individually have different devices and may have different devices available to other people, it is impossible for one manager to set permission for each home device which is owned or managed by each user.

Accordingly, there is a need for an improved system and method of guaranteeing security and privacy for the use of each home device by setting permission for each user by an owner or manager for each home device when there is an owner or manager for each home device in a home network and also when there are multiple users.

SUMMARY OF THE INVENTION

An aspect of exemplary embodiments of the present invention is to address at least the above problems and/or disadvantages and to provide at least the advantages described below. Accordingly, an aspect of an exemplary embodiment of the present invention is to provide an ownership sharing method and apparatus using a secret key in a home network remote controller.

According to an exemplary embodiment of the present invention, a user that owns a home device generates an ownership authentication key using the secret key shared with the home device through the user's terminal device. The ownership authentication key is transmitted to a terminal device of a particular user who wishes to share the ownership, and the particular user can use the home device by using the shared ownership authentication key.

An ownership sharing method of a home network remote controller is provided. According to an exemplary embodiment of the present invention, ownership from a main remote controller that owns a first device is received and shared. A request to share the ownership is made to the main remote controller. An ownership authentication key generated by using a secret key is received from the main remote controller. The ownership authentication key is transmitted to the first device and a service from the first device is received.

The operation of requesting sharing of the ownership comprises transmitting request data including an identification (ID) of the remote controller and a name of the first device to the main remote controller.

For an ownership authentication key generation the main remote controller generates the ownership authentication key using the secret key, the ID of the remote controller and the name of the first device.

The secret key is shared by the main remote controller and the first device.

The operation of transmitting the ownership authentication key to the first device comprises requesting the service to the first device from a qualified user, receiving a random number from the first device to challenge a qualified user and transmitting a first confirmation key, acquired by putting the ownership authentication key and the random number into a hash function, to the first device.

The first device generates the ownership authentication key using the ID of the remote controller, the secret key shared with the main remote controller and other information, acquires a second confirmation key by putting the ownership authentication key and the random number into the hash function, and executes the service if the first confirmation key and the second confirmation key are the same.

In order to achieve another aspect of an exemplary embodiment of the present invention, a home network remote controller uses a first device by receiving and sharing ownership from a main remote controller that owns the first device. The home network remote controller comprises memory, a location limited channel (LLC) interface, an authentication requester and a controller. A memory stores personal information on a user, information on each home device accessible by a user, and an ownership authentication key received from the main remote controller. A location limited channel (LLC) interface supports wireless communications with the first device and the main remote controller. An authentication requester transmits a confirmation key, acquired by putting a random number received from the first device and the ownership authentication key into a hash function, to the first device. A controller transmits the ownership authentication key to the first device and receives a service from the first device.

The information on home device includes a device type, a vender, a model name, a serial number and a private IP address allocated in a home network.

In order to achieve another aspect of an exemplary embodiment of the present invention, a home network remote controller, which owns a first device, provides an ownership authentication key to a sub remote controller requesting sharing of the ownership. The home network remote controller comprises a memory, a location limited channel (LLC) interface, an authenticator and a controller. The memory stores a secret key shared with the first device. The location limited channel (LLC) interface supports wireless communications with the first device and the sub remote controller. The authenticator generates the ownership authentication key by using the secret key and transmits the ownership authentication key to the sub remote controller. The controller generates the ownership authentication key using the secret key.

The authenticator generates the ownership authentication key using the secret key, an ID of the sub remote controller and a name of the first device.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspect, other features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description, such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, well-known functions and constructions are omitted for clarity and conciseness.

Figure 1:
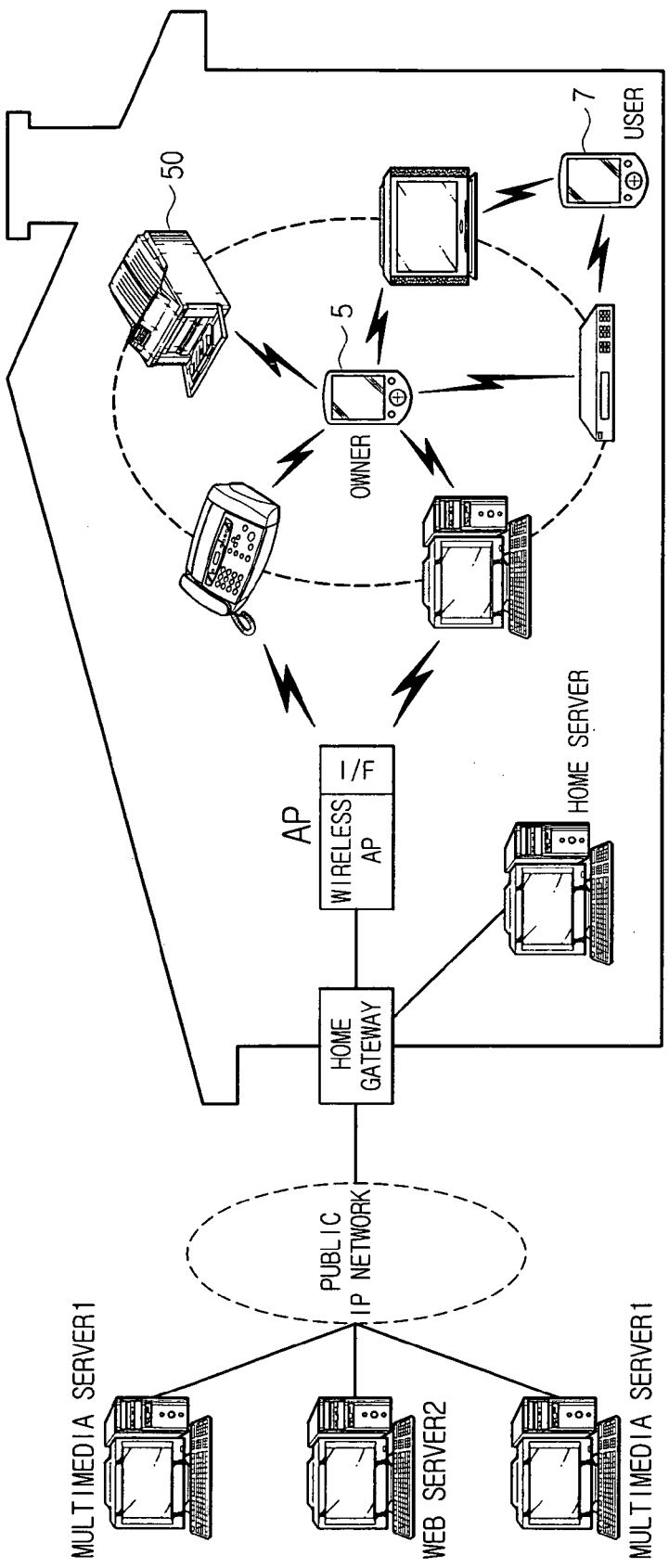
FIG. 1 illustrates a configuration of a home network to describe an ownership sharing method using a secret key in a home network remote controller according to an exemplary embodiment of the present invention.

FIG. 1 illustrates a configuration of a home network describing an ownership sharing method using a secret key in a home network remote controller according to an exemplary embodiment of the present invention.

The home network includes plural home devices included in at least one domain and remote controllers 5 and 7. Remote controllers 5 and 7 remotely control authentication and operation of a first device 50 included in a user's domain and form a user-dependent domain. The domain is a concept gathering at least one first device 50 to which a user is granted access, and a domain for each user is determined by the owner or manager of each home device.

The home devices including the first device are connected to one another to form a home network. A remote controller operates and authenticates the home devices. The remote controller is implemented with various input devices and with a display unit displaying input of a user, such as a personal digital assistant (PDA) and cell phone. The remote controller (RC) in the home network, according to an exemplary embodiment of the present invention, includes a main RC 5 used by the owner and a sub RC 7 used by the user.

The number of RCs corresponds to the number of users in the home network. The RCs are used for authentication and operation of the home devices by each user. Accordingly, one domain generated for each user is considered to be a set of home devices operated by the RC.

The RC is divided into the main RC 5 and the sub RC 7. The owner or manager which owns or manages the first device 50 keeps the main RC 5. The sub RC 7 of a user is granted access to the first device 50 by the owner or manager.

According to an exemplary embodiment of the present invention, the main RC 5 has ownership of the first device 50 and generates an ownership authentication key using a secret key shared with the first device 50, information on the sub RC 7 and other information when a request of ownership sharing is received. The main RC 5 transmits the ownership authentication key to the sub RC 7.

Meanwhile, the sub RC 7 requests a service to the first device 50 based on the ownership authentication key received from the main RC 5.

Then the first device 50 generates an ownership authentication key in a manner similar to the method of generating the ownership authentication key of the main RC 5 using the information on the sub RC 7 and other information to confirm the ownership of the sub RC 7. The ownership authentication key is compared with the ownership authentication key given by the sub RC 7. According to the result, the service requested by the sub RC 7 is provided.

Figure 2:
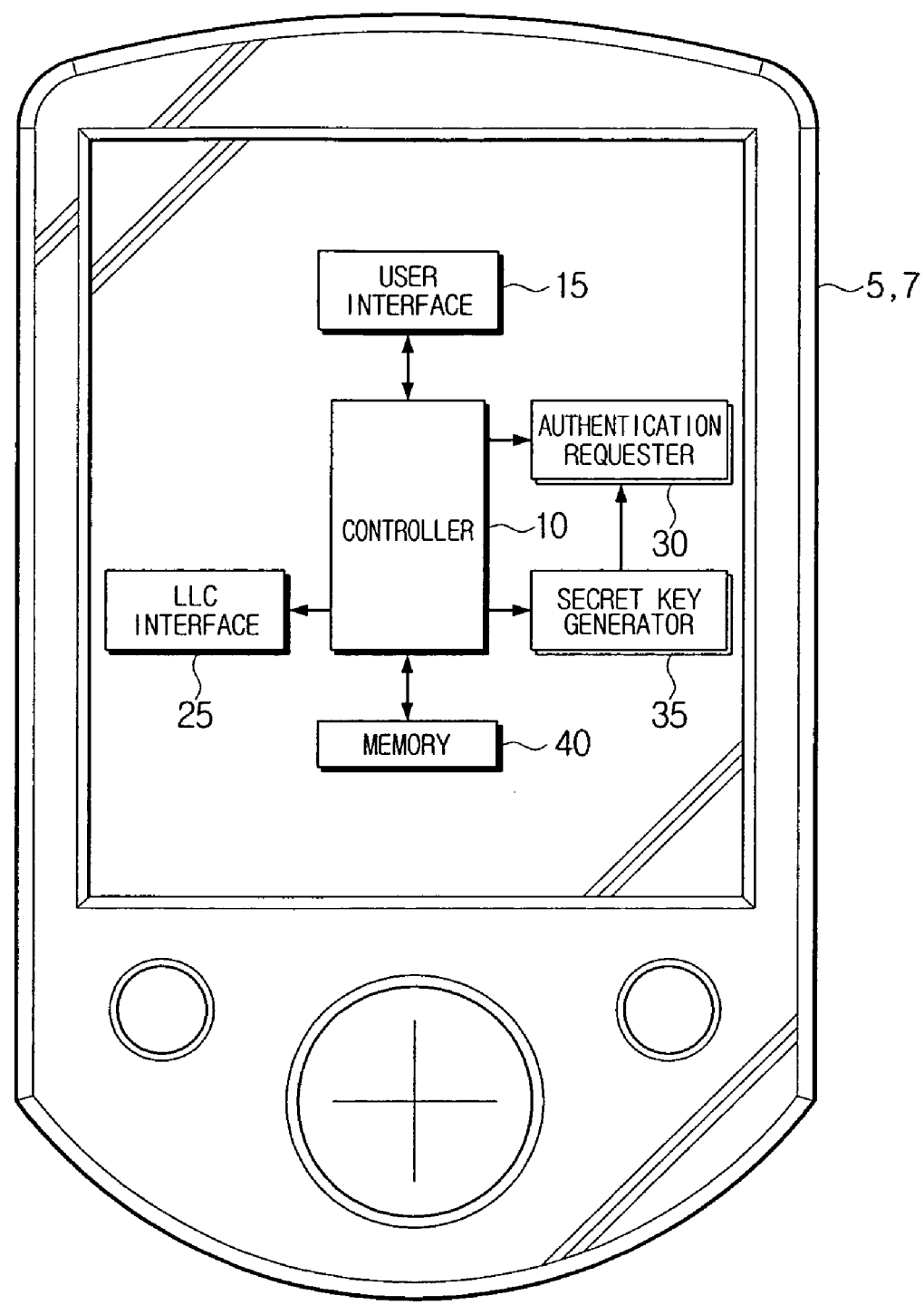
FIG. 2 is a schematic diagram illustrating the configuration of a remote controller according to an exemplary embodiment of the present invention.

FIG. 2 is a schematic diagram illustrating the configuration of a remote controller according to an exemplary embodiment of the present invention.

The RC 5 and 7 includes a memory 40, a user interface 15, a location limited channel (LLC) interface 25, an authentication requester 30, a secret key generator 35 and a controller 10 as illustrated in FIG. 2.

The memory 40 of the RC 5 and 7 stores different information according to functioning as the main RC 5 or the sub RC 7.

The memory 40 of the main RC 5 stores information on a home device that forms one domain managed by the owner or manager, such as a model name of the first device 50, inside IP address, and access key accessing the corresponding home device. The memory 40 also stores an access control list (ACL) which contains information on available users for each home device in the network, who are set by the owner or manager. The ACL includes information on the sub RC 7 owned by each available user, and a hash function encrypting a public key for the corresponding sub RC 7.

The memory 40 of the sub RC 7 stores personal information on the corresponding user, information on each home device which the corresponding user can access, and authentication information on each home device. The information on the home device includes a device type, vender, model name, serial number, and private IP address allocated in the home network. The authentication information includes a common public key used in the corresponding domain, and ownership authentication key and domain key, received from the main RC 5. As described above, the RC 5 and 7 functions as all of the main RC and the sub RC 7 stores both the information stored in the memory 40 of the main RC 5 and the information stored in the memory 40 of the sub RC 7.

The user interface 15 can be implemented with a display window. In the main RC 5, the user interface 15 displays information input by manipulation of the owner and manager and the control state of each home device, and in the sub RC 7, the user interface 15 displays information input by manipulation of the user and the control state of each home device. The user interface 15 can include buttons to input information as well as the display window or a touch panel on the display window in order for the user to directly input information by a stylus pen or finger.

The LLC interface 25 supports wireless communications with the home devices. The first device 50, RC 5 and sub RC 7 share mutual information using the LLC interface 25. The main RC 5 provides ownership authentication key information for permission of the first device 50 to the sub RC 7 and each home device through the LLC interface 25. The sub RC 7 requests authentication of the first device 50 using the ownership authentication key information received through the LLC interface 25.

According to an exemplary implementation, the authentication process of the authentication requester 30 varies according to functioning as the main RC 5 and the sub RC 7. In the sub RC 7, the authentication requester 30 requests authentication of the first device 50 using the ownership authentication key received from the main RC 5 to use the first device 50.

In the main RC 5, the authentication requester 30 generates a command requesting recognition for the main RC 5 to each home device included in the main domain. Each home device confirms whether there is information on the main RC 5, such as an identification (ID) of the main RC 5 and the owner or manager. If there is no information on the main RC 5, the home device stores the information on the main RC 5 provided from the main RC 5 in the memory 40, generates a secret key and provides the secret key to the main RC 5. If authentication of the main RC 5 is completed, the main RC 5 provides the ACL, and a media access control (MAC) to each home device. The ACL includes information on sub RC 7 with permission for the corresponding home device. The MAC is a result value of the hash function using a nonce received from each home device to update the secret key, device information and ACL.

The first device 50 confirms the MAC value using the secret key stored in the memory 40 and shared with the main RC 5, and accepts the ACL if both MAC values are the same.

Meanwhile, the authentication requester 30 of the sub RC 7 requests authentication of the first device 50 with permission by the owner or manager, and provides the information on the sub RC 7 and the ownership authentication key received from the main RC 5 to the first device 50 at that moment.

When the ownership authentication request is received from the sub RC 7, the first device 50 generates an ownership authentication key using the secret key shared with the main RC 5 and information on the sub RC 7. If the ownership authentication key and the ownership authentication key provided by the sub RC 7 are the same, the first device 50 authenticates the ownership of the sub RC 7 so that the service requested by the sub RC 7 is provided.

The secret key generator 35 generates a secret key to control an operation between the sub RC 7 and each home device under the domain to operate the home device that belongs to the sub RC 7 and that forms a domain. The secret key is randomly formed, encrypted with the nonce and session information, and transmitted to each home device under the corresponding domain.

The home device stores the secret key provided from the sub RC 7 in the memory 40 and makes a determination as to whether to perform the command according to whether both secret keys are the same when confirming the corresponding domain in communication with the RC 5 and 7 or home device. The home device makes a determination as to whether to perform the command according to whether both secret keys are the same in communication with the sub RC 7.

The controller 10 controls the operation of each component according to commands of the owner, manager and user input through the user interface 15, and controls communication with the first device 50 through the LLC interface 25.

Meanwhile, the first device 50 includes a memory, a network interface, a LLC interface, an authenticator and a controller.

The memory of the first device 50 stores information on the first device 50, the ACL list of the sub RC 7 provided from the main RC 5, and information on the main RC 5. Additionally, the memory of the first device 50 stores information on the sub RC 7 provided from the authenticated sub RC 7 and information on the secret key shared with the sub RC 7.

The network interface supports wireless communications between a server in the home network and the first device 50, and can be implemented with IEEE 802.11b/a, IEEE 802.11e, WiMedia, and HiperLAN, among others.

The LLC interface of the first device 50 supports communications with the RC 5 and 7 and the first device 50 by interworking with the LLC interface 25 of the RC 5 and 7.

The authenticator determines whether the ACL stored in the memory includes information on the sub RC 7 requesting authentication when it recieves request of authentication from the sub RC 7. If the information on the sub RC 7 is included, the authenticator generates an ownership authentication key using the secret key shared with the main RC 5 and the information on the sub RC 7. Subsequently, if the ownership authentication key and the ownership authentication key provided from the sub RC 7 are the same, the ownership of the sub RC 7 is authenticated.

Furthermore, the authenticator receives the secret key randomly generated from the sub RC 7 and confirms whether the secret key and the secret key which is received from the main RC 5 and stored in the memory are the same. As a result, if both secret keys are the same, the authenticator stores the secret key matched with the information on the corresponding sub RC 7. When the first device 50 communicates with the RC 5 and the sub RC 7 or a home device, the secret key will be used to confirm the corresponding domain, and to determine whether to perform the service request of the sub RC 7 based on the secret key.

Figure 3:
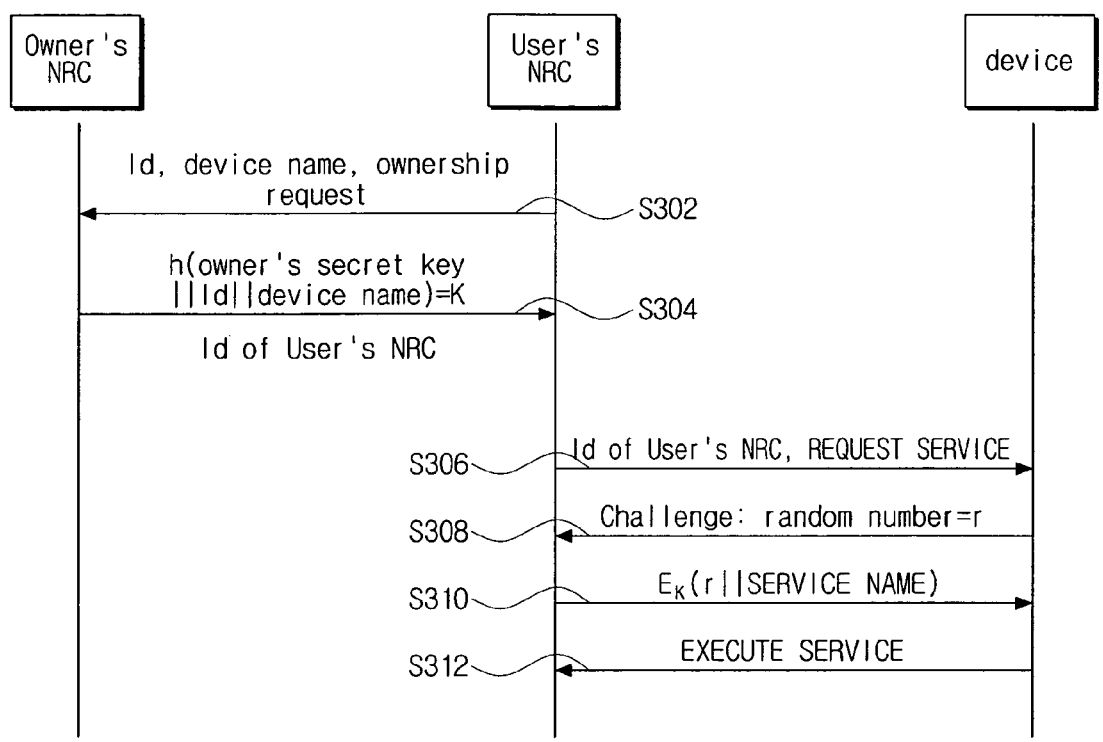
FIG. 3 illustrates a flow chart describing an ownership sharing method that uses a secret key in a home network remote controller according to an exemplary embodiment of the present invention.

FIG. 3 illustrates a flow chart to describe an ownership sharing method using a secret key in a home network remote controller according to an exemplary embodiment of the present invention.

In order to receive an ownership from a owner having the ownership of a first device 50, a user initially requests the ownership from the main RC 5 which is a owner's NRC using a sub RC 7 which is a user's NRC.

At the moment, the user requests the ownership by transmitting information, such as the ID of the sub RC 7 and the device name of the first device 50 to be used, to the main RC 5 (S302).

In response to the request, the main RC 5 generates an owner authentication key K by applying a hash function to a secret key shared with the first device 50, and the information such as the ID of the sub RC 7 and the device name of the first device 50.

The main RC 5 transmits the generated owner authentication key K to the sub RC 7 (S304).

The sub RC 7 receives the owner authentication key K from the main RC 5, and transmits a service request signal including the ID of the sub RC 7 to the first device 50 to request the service (S306). For example, if the first device 50 is a printer, the sub RC 7 transmits a print command signal including the ID of the sub RC 7 to the first device 50.

The first device 50 receives the service request from the sub RC 7, generates a random number 'r' and transmits it to the sub RC 7 to perform a challenge confirming whether the sub RC 7 is a qualified user (S308).

The sub RC 7 acquires a confirmation key Ek by putting the ownership authentication key K received from the main RC 5 and the 'r' of the random number into a hash function, and transmits the confirmation key Ek together with a name of the service to the first device 50 (S310).

Meanwhile, the first device 50 generates an ownership authentication key K in a manner similar to that used in the main RC 5 using the ID of the sub RC 7, the secret key shared with the main RC 5 and other information, and acquires a new confirmation key Ek by putting the ownership authentication key K and the random number 'r' into a hash function. The confirmation key Ek received from the sub RC 7 and the new confirmation key Ek are compared. If both are the same, the service requested from the sub RC 7 is executed (S312). Alternatively, if both are not the same, the first device 50 cancels the service request from the sub RC 7.

The ownership for a device can be easily shared in the home network environment based on a secret key.

Additionally, the complex calculation process for sharing the ownership between the owner of the device and his family or customers is not necessary, and security is guaranteed based on the secret key.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An ownership sharing method of a home network remote controller, the method comprising:

transmitting, to a main remote controller, a request to share in control of a first device that is controlled by the main remote controller;

receiving, from the main remote controller, permission to share in the control of the first device including an ownership authentication key generated by the main remote controller by hashing a secret key shared between the main remote controller and the first device;

transmitting the ownership authentication key directly to the first device; and in response to the first device verifying the authenticity of the transmitted ownership authentication key, receiving the requested service directly from the first device, wherein the ownership authentication key is used for authentication of the main remote controller and of the home network remote controller, the transmitting of the ownership authentication key to the first device comprises receiving a random number from the first device to challenge a qualified user, and transmitting a first confirmation key, acquired by putting the ownership authentication key and the random number into a hash function, to the first device, and the first device generates the ownership authentication key using the ID of the home network remote controller and a secret key shared with the main remote controller, acquires a second confirmation key by putting the ownership authentication key and the random number into the hash function, and if the first confirmation key and the second confirmation key are the same, the first device provides the home network remote controller with the service and the ability to manage the first device.

2. The method of claim 1, wherein the transmitting the request to share in the control to the main remote controller comprises transmitting request data including an identification (ID) of the home network remote controller and a name of the first device.

3. The method of claim 1, wherein the main remote controller generates the ownership authentication key using a secret key, an ID of the home network remote controller, and the name of the first device.

4. The method of claim 3, wherein the secret key is shared by the main remote controller and the first device.

5. The method of claim 1, wherein the secret key is shared by the main remote controller and the first device.

6. A home network remote controller for requesting to share in management of a first device, the home network controller comprising:

a memory for storing personal information about a user, information about each home device which the user is accessible to, and an ownership authentication key received from a main remote controller and that is generated by the main remote controller by hashing a secret key shared between the main remote controller and the first device;

a location limited channel (LLC) interface for supporting wireless communications between the home network remote controller and the first device and between the home network remote controller and the main remote controller, for transmitting, to the main remote controller, a request to control the first device which is controlled by the main remote controller, and for receiving permission to share in control of the first device including the ownership authentication key from the main remote controller;

an authentication requester for transmitting, to the first device, an authentication request including information about a home network device controlled by the home network remote controller and the ownership authentication key received from the main remote controller; and a controller for controlling the operation of the first device according to user commands, wherein the controller is authorized to share in control of the first device, if the first device is able to verify the authenticity of the ownership authentication key transmitted by the authentication requester, and the authorization to control the first device enables the home network controller to provide another home network controller with permission to control the first device.

7. The home network remote controller of claim 6, wherein the information about a home network device comprises a device type, a vender, a model name, a serial number, and a private IP address allocated in a home network.

8. A method of a home network remote controller for sharing ownership of a home network device, the method comprising:
- transmitting a request to share in control of ownership of a first device that is controlled by the main remote controller, to the main remote controller;
- receiving permission to share in the control of the ownership of the first device from the main remote controller, wherein the permission comprises a hashed secret key that is shared between the main remote controller and the first device;
- transmitting the received permission directly to the first device; and
- receiving the ability to share in control of the ownership of the first device, directly from the first device,
- wherein the permission is used for authentication of the main remote controller and of the home network remote controller,
- the transmitting of the received permission to the first device comprises receiving a random number from the first device to challenge a qualified user, and transmitting a first confirmation key, acquired by putting the hashed secret key and the random number into a hash function, to the first device, and
- the first device generates the hashed secret key using the ID of the home network remote controller and a secret key shared with the main remote controller, acquires a second confirmation key by putting the ownership authentication key and the random number into the hash function, and if the first confirmation key and the second confirmation key are the same, the first device provides the home network remote controller with the service and the ability to manage the first device.

* * * * *